United States Patent [19]

Inaba et al.

[11] 4,133,230
[45] Jan. 9, 1979

[54] MACHINE TOOL

[75] Inventors: Seiuemon Inaba; Tokiji Shimajiri, both of Kawasaki; Shigeaki Oyama, Hachioji, all of Japan

[73] Assignee: Fujitsu Fanuc Limited, Japan

[21] Appl. No.: 801,572

[22] Filed: May 31, 1977

[30] Foreign Application Priority Data

Jun. 1, 1976 [JP] Japan ............................. 51-70728[U]
Jun. 1, 1976 [JP] Japan ............................. 51-70729[U]

[51] Int. Cl.² ........................................... B23B 19/02
[52] U.S. Cl. ................................. 82/28 R; 82/DIG. 1
[58] Field of Search ..................... 82/28, 30, DIG. 1

[56] References Cited

U.S. PATENT DOCUMENTS

| 1,185,681 | 6/1916 | Kienzle | 82/28 R |
|---|---|---|---|
| 1,947,829 | 2/1934 | Cole | 82/28 R |
| 1,961,546 | 6/1934 | Benson | 82/DIG. 1 |
| 2,009,354 | 7/1935 | Burrell | 82/DIG. 1 |
| 2,251,442 | 8/1941 | Emmons | 82/DIG. 1 |
| 2,352,206 | 6/1944 | Kendall | 82/DIG. 1 |
| 2,364,730 | 12/1944 | Leskin | 82/DIG. 1 |
| 3,752,019 | 8/1973 | Kaneko | 82/28 R |
| 4,037,496 | 7/1977 | Gerth | 82/28 R |

FOREIGN PATENT DOCUMENTS 912711 12/1962 United Kingdom ................ 82/DIG. 1

Primary Examiner—Harrison L. Hinson
Attorney, Agent, or Firm—Staas & Halsey

[57] ABSTRACT

Disclosed herein is a machine tool consisting of a bed, a fast head stock mounted on the bed and a main spindle rotatably supported by the fast head stock, and wherein the main spindle is an integral part of an output shaft of an electric motor.

2 Claims, 7 Drawing Figures

MACHINE TOOL

BACKGROUND OF THE INVENTION

The present invention relates generally to a machine tool, such as a lathe, milling machine or boring machine and the like, and, more particularly, relates to a machine tool having an improved mechanism for driving a main spindle.

Generally speaking, conventional machine tools have main spindles to which a rotational driving force is transmitted from main spindle driving electric motors fixed on bases on the like through suitable transmitting mechanisms, such as, for example, belt transmissions including belts and pulleys, gear transmissions or the like. Because transmitting mechanisms are necessary for fulfilling the above purpose, the construction of such conventional machine tools becomes complicated thereby increasing the cost thereof. Additionally, it is difficult to increase stability in the rotational speeds of the main spindles, due to slippage caused in the transmitting mechanisms or in the backlash of gear trains.

It is a principal object of this invention to provide a machine tool which does not have the above-mentioned defects.

It is a further object of this invention to provide a machine tool wherein a main spindle thereof is rotated at stable rotational speeds.

It is a still further object of this invention to provide a machine tool which has fewer parts than those of conventional machine tools, and which thus costs less to construct.

DESCRIPTION OF THE PREFERRED EMBODIMENT

Figure 7:
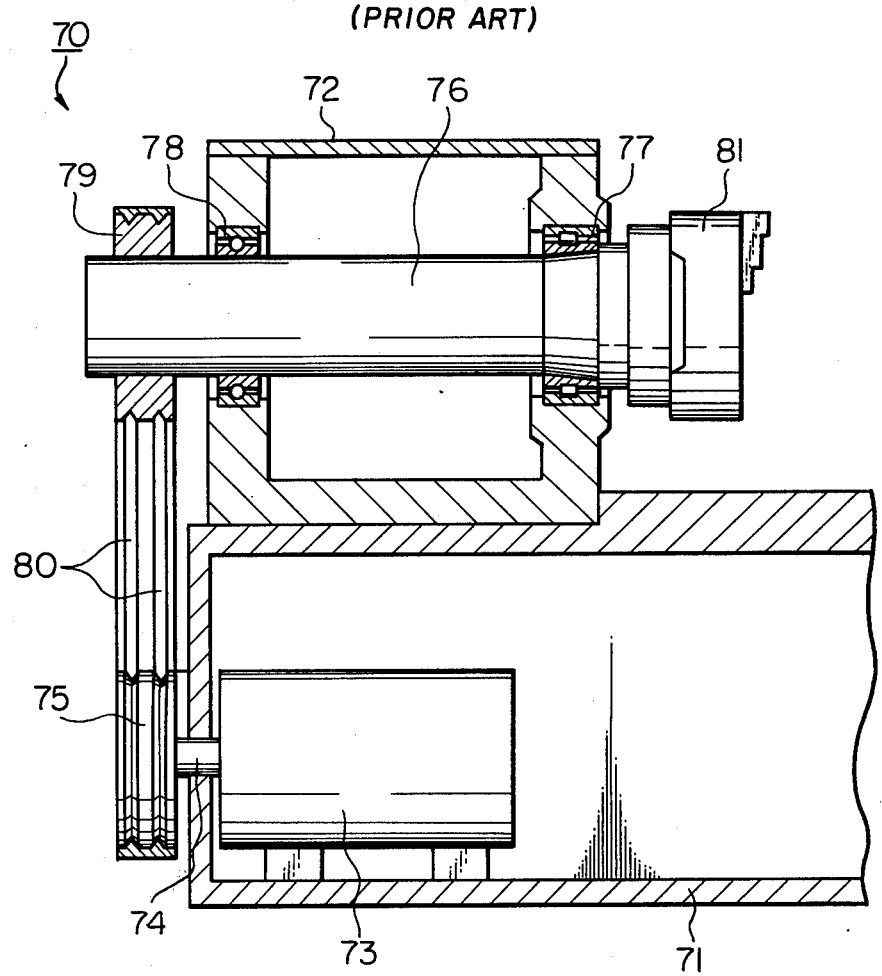
FIG. 7 is a vertical cross-sectional view of the main portion of a conventional machine tool.

Referring to FIG. 7, a conventional lathe is shown as one example of machine tools of the prior art. In FIG. 7, the lathe generally designated by reference numeral 70 comprises a bed 71 fixed on a floor and a fast head stock 72 mounted on the bed 71. An electric motor 73, which drives a main spindle of the lathe, is rigidly secured in the bed 71. The electric motor 73 has an output shaft 74 extending outwardly from the bed 71 and a drive pulley 75 rigidly attached to the end of the output shaft 74. A main spindle 76 is rotatably supported on the fast head stock 72 by a front bearing member 77 and a rear bearing member 78, and has a driven pulley 79 rigidly attached to one end thereof. V-shaped belts 80 extend over the drive pulley 75 and the driven pulley 79. The transmission mechanism comprising the drive pulley 75, the driven pulley 79 and the V-shaped belts 80 transmits the rotational force of the electric motor 73 to the main spindle 76. The main spindle 76 has at the other end thereof a chuck 81 which includes means for holding a work piece which is rotated integrally with the main spindle 76. Such conventional machine tools are characterized by the disadvantages referred to previously because of the transmission mechanisms, such as pulleys, belts gears, couplings and the like.

Figure 1:
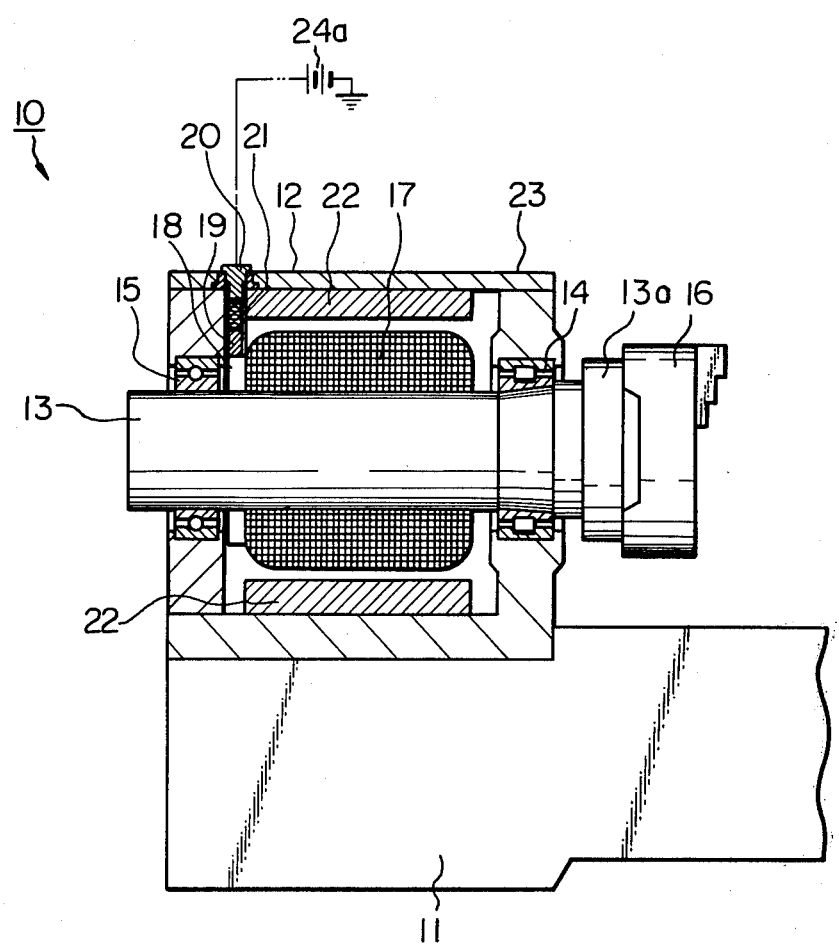
FIG. 1 is a vertical cross-sectional view of the main portion of a machine constructed in accordance with the present invention.
Figure 2:
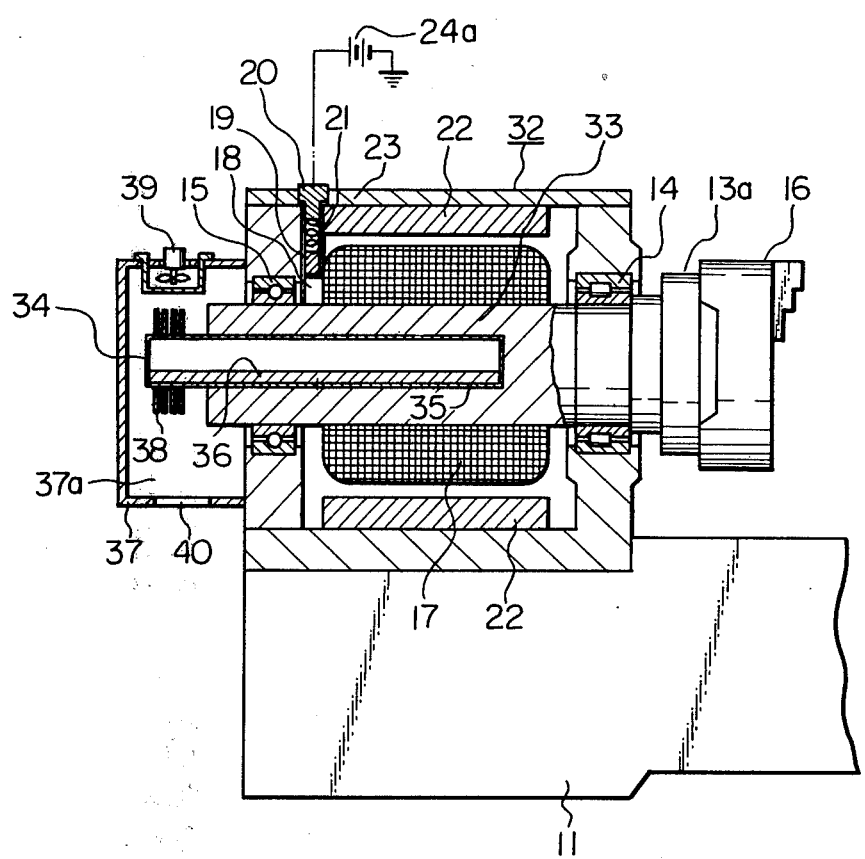
FIG. 2 is a vertical cross-sectional view of the main portion of another embodiment of machine tool construction in accordance with the present invention.
Figure 3:
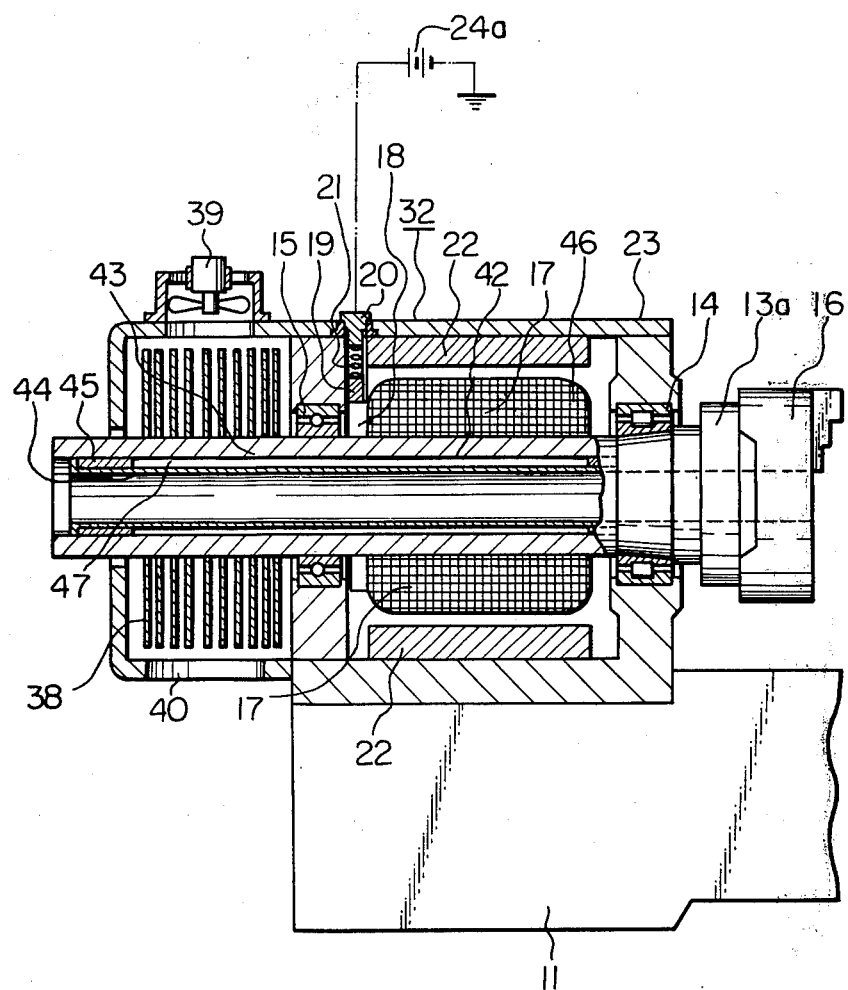
FIG. 3 is a vertical cross-sectional view of the main portion of still another embodiment of a machine tool construction in accordance with the present invention.

In FIGS. 1, 2 and 3, embodiments of a machine tool according to the present invention are disclosed, it being apparent that only sections of main portions thereof are shown in the drawings. In the embodiment shown in FIG. 1, the lathe (machine tool) generally indicated by reference numeral 10 comprises a bed 11 fixed on a floor and a fast head stock 12 mounted on the bed 11. A main spindle 13 is rotatably mounted on the fast head stock 12 by a front bearing member 14 and a rear bearing member 15. The main spindle 13 terminates in an end 13a which is formed integrally with the main spindle 13. A chuck member 16, including means for holding a workpiece, is rigidly mounted on the end 13a and is rotated integrally with the main spindle 13. At the central portion of the main spindle 13, armature windings 17 are rigidly secured. The armature windings 17 are provided with commutators 18, with which brushes 19 contact. Coil springs 21 are disposed between the brushes 19 and the spring adjusting screws 20. Electric power is supplied to the armature windings 17 from an outside voltage source 24a through the brushes 19 and the commutators 18 in a well-known manner. The armature windings 17 are surrounded by static field means 22 which are constructed from permanent magnets and circumferentially arranged at regular intervals, so that a slight clearance is formed between the armature windings 17 and the static field means 22 in the radial direction. The static field means 22 are supported by a cover member 23 which is secured to the fast head stock 12 and arranged so as to cover the armature windings 17. That is to say, the main spindle 13, armature windings 17 and field means 22 define a spindle D.C. motor.

In this embodiment, it is not necessary to provide transmission mechanisms, such as pulleys, belts, gears, couplings and the like, because the main spindle 13 is constructed as an output shaft of an electric motor, and, thus, the machine tool according to this invention is simple in construction and possible to manufacture at low cost. Additionally, the performance and reliability of this machine tool are higher than in the case of conventional machine tools, because no slippage occurs in the transmission mechanisms or in the backlash of the gear trains.

In the embodiment shown in FIG. 2, the main spindle 33 has a heat pipe 34 therein which is rigidly inserted into the cylindrical hollow portion 35 which is formed axially in the main spindle 33 so as to be open at one end and closed at the other end thereof. This heat pipe 34 is fluid-tight, into which working fluid 36, such as water or alcohol, is received. The free end of the heat pipe 34 extends into a casing 37 mounted on a fast head stock 32 and is provided with a plurality of fins 38 positioned in the casing 37. At the upper portion of the casing 37, a fan assembly 39 is mounted, and at the bottom portion thereof an air slot 40 is formed. The casing 37 is formed as an air flow chamber 37a. The construction of the other portions of this embodiment are the same as those of the embodiment illustrated in FIG. 1.

In the embodiment of FIG. 2, the heat pipe 34 conducts the heat generated by the electric currents exciting the armature windings 17 from the main spindle 33 toward the end of the heat pipe 34, which is provided with a plurality of fins 38. The working fluid 36, such as water, in the heat pipe 34 conducts heat by means of vaporization and condensation. The heat pipe 34 is cooled via the plurality of fins 38 by cool air which is supplied to the casing 37 by the fan assembly 39. That is to say, the cool air flows into the casing 37 through an air slot 40 and is heated by the fins 38, then the heated air flows out through the fan assembly 39. According to this embodiment, it is possible to avoid the harmful results caused by the heat generated in the armature windings 17, which can disadvantageously affect every part of the machine tool.

In the further embodiment shown in FIG. 3, a cylindrical bore 42 which is hollow throughout is formed in the heat pipe 43 along the axis thereof. In the bore 42 there is disposed an inner pipe member 44. At the ends of the inner pipe 44 two annular sleeves 45 and 46 are disposed in fluid-tight relationship between the outer surface of the pipe 44 and the inner surface of the bore 42. Thus, an annular hollow chamber or heat conducting passage 47 is formed between the inner surface of the bore 42 and the pipe member 44. This annular chamber 47 is maintained in substantially a condition of vacuum, and contains a small quantity of the heat conductive medium, such as 10% of the volume of the chamber 47 being filled with water. The constructions of the other portions of this embodiment are the same as those of the embodiment illustrated in FIG. 2.

In the embodiment of FIG. 3, the annular chamber 47 conducts the heat generated in the armature windings 17 in the same manner as the heat pipe 34 of the embodiment illustrated in FIG. 2. According to the machine tool of FIG. 3, it is possible to machine a long-sized piece of work because the main spindle has a hollow cylindrical portion therethrough.

Figure 4:
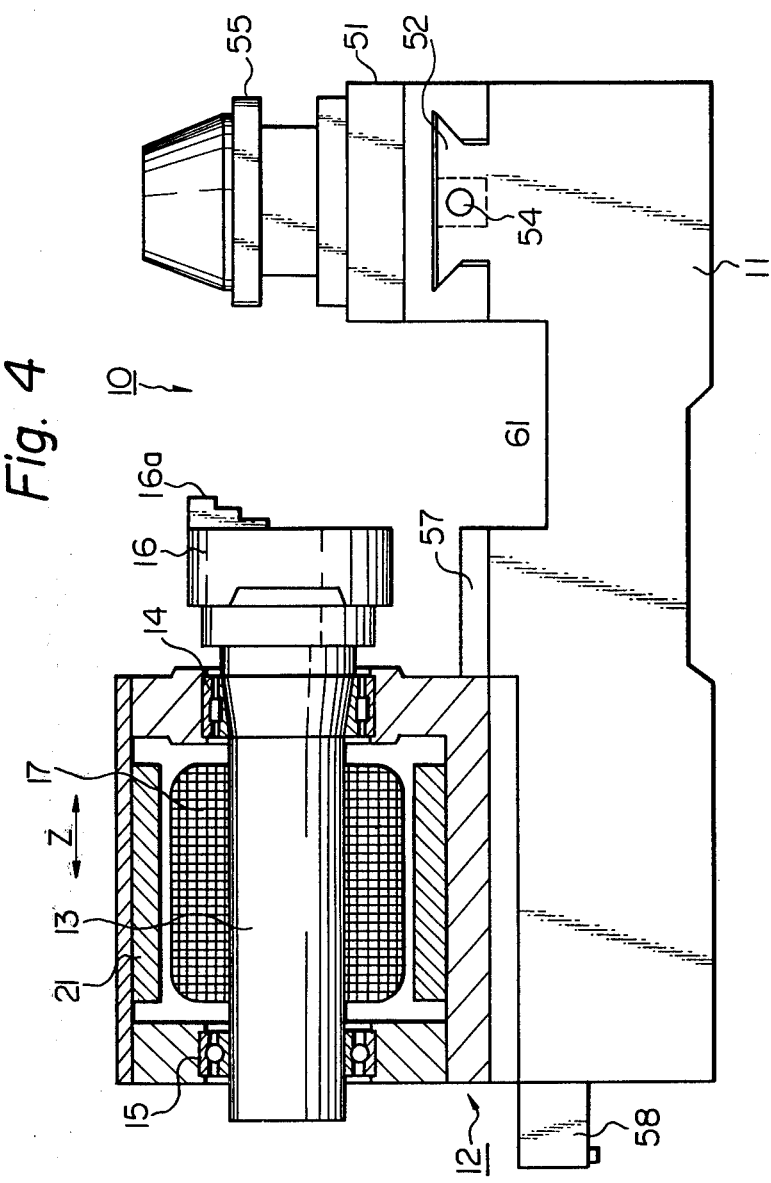
FIG. 4 is an elevational view partly in section of the machine tool of the present invention.
Figure 5:
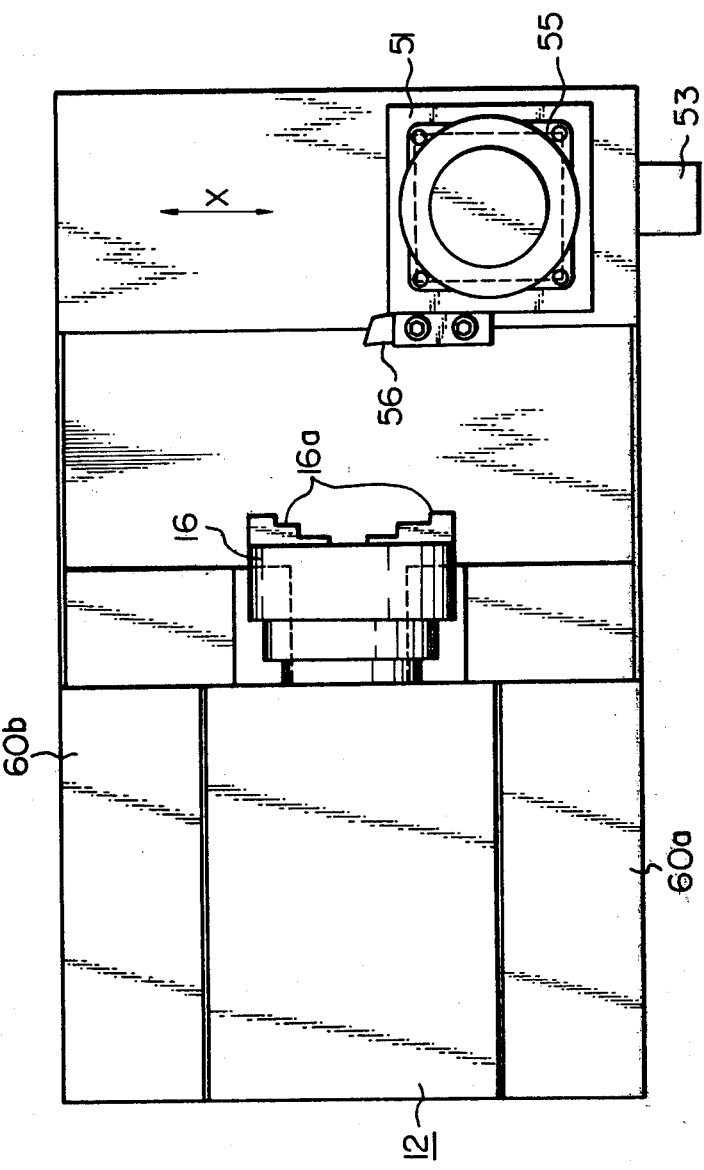
FIG. 5 is a top plan view of the machine tool shown in FIG. 4.
Figure 6:
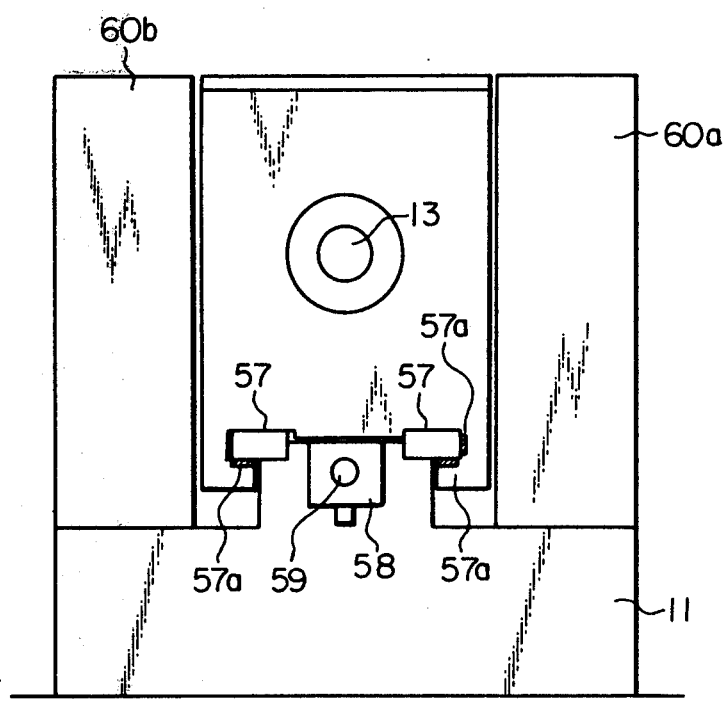
FIG. 6 is a left side elevational view of the machine tool shown in FIG. 4.

FIGS. 4, 5 and 6 are an elevational view, a top plan view and a side elevational view, respectively, showing the machine tool of the embodiment illustrated in FIG. 1. The lathe (machine tool) generally indicated by reference numeral 10 comprises a bed 11 fixed on a floor, a fast head stock 12 mounted on the bed 11 at one end thereof, and a tool head 51 mounted on the bed 11 at the other end thereof. The tool head 51 is slidably mounted to in the direction of the X-axis in FIG. 5 along a guide rail 52 formed on the bed 11 by an electric motor 53 and a screw rod 54 attached to the output shaft of the motor 53. A tool holder 55 is fixed onto the tool head 51. Various kinds of tools for grinding work, such as a tool bit 56, can be rigidly attached to the tool holder 55. The fast head stock 12 is also slidably mounted to move in the direction of the in FIG. 4, which Z-axis is perpendicular to the X-axis, along guide rails 57, (which come into contact with slip metals 57a, in FIG. 6), formed on the bed 11 by an electric motor 58 and a screw rod 59 attached to the output shaft of the motor 58. This machine tool is also provided with a numerical control device comprising an operation controller 60a placed on one side of the fast head stock 12 and an amplifier 60b placed on the other side of the fast head stock 12, which control device is used to control the movements of the fast head stock 12 and the tool head 51.

In the machine tool shown in FIGS. 4, 5 and 6, it is possible to move the fast head stock 12 in the direction of the Z-axis because the main spindle 13 is constructed as the output shaft of the electric motor, so that it is sufficient to move the tool head 51 only in the direction of the X-axis. Therefore, the feeding mechanisms of the machine tool according to the present invention is relatively simple in construction as compared to conventional machine tools. Furthermore, it is possible to provide a chip pan 61 just under the cutting portion, because the tool head moves only in the direction of the X-axis.

Although in the embodiments hereinbefore described permanent magnets are used for the static field means of a spindle D.C. motor, direct current static means can be also used. Moreover, this invention is applicable to a machine tool which has work holding means at one end of a main spindle, as well as a machine tool which has tool holding means at one end of the main spindle.

As different embodiments of this invention may be made without departing from the spirit and scope of the invention, it is to be understood that the invention is not limited to the specific embodiments hereinbefore described but is applicable to milling machines, boring machines and the like, and limited only as defined in the appended claims.

What is claimed is:

1. A machine tool, comprising:
   a bed;
   a head stock mounted on said bed;
   a main spindle rotatably mounted on said head stock, said main spindle being provided with a conduit constructed integrally therewith, extending outwardly therefrom, and terminating in an end;
   armature windings rigidly secured to said main spindle;
   field means for producing a magnetic field arranged around said armature windings and spaced therefrom;
   means for supplying electric power to said armature windings;
   an air flow chanber having at least one air shot, said end of said conduit being positioned within said air flow chamber;
   a fan mounted within said air flow chamber;
   working fluid means contained within said conduit for conducting heat generated in said armature windings from said main spindle; and
   at least one fin provided on said conduit near said end thereof.

2. A machine tool as set forth in claim 1, further comprising means rigidly mounted on one end of said main spindle for holding a workpiece.

* * * * *

UNITED STATES PATENT AND TRADEMARK OFFICE
CERTIFICATE OF CORRECTION

PATENT NO. : 4,133,230
DATED : January 9, 1979
INVENTOR(S) : Seiuemon Inaba et al It is certified that error appears in the above-identified patent and that said Letters Patent are hereby corrected as shown below:

```
Column 1, line 13, "on" (second occurrence) should be
    --or--.
Column 2, line 10, "belts gears" should be --belts, gears--.
Column 3, line 55, after "the" (second occurrence) insert
    --Z-axis--.
Column 4, line 48, "chanber" should be --chamber--.
```

Signed and Sealed this

Twelfth Day of June 1979

[SEAL]

Attest:

RUTH C. MASON
Attesting Officer

DONALD W. BANNER
Commissioner of Patents and Trademarks